March 17, 1931.    H. JAGGAR    1,797,148
BRAKE OPERATING MECHANISM FOR VEHICLES
Filed July 25, 1929
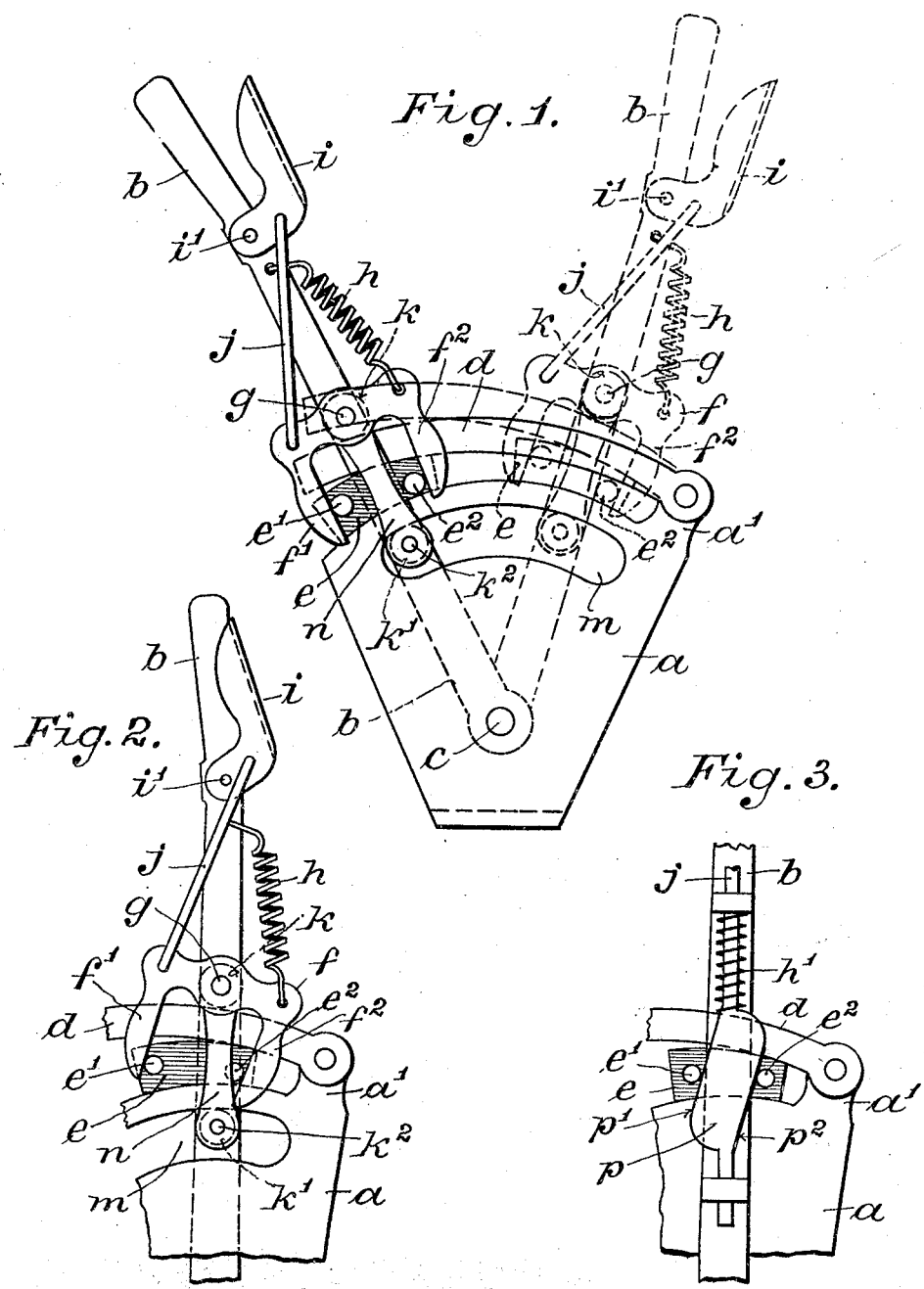
Inventor,
Herbert Jaggar
by Monroe E. Miller Atty.

Patented Mar. 17, 1931

1,797,148

UNITED STATES PATENT OFFICE

HERBERT JAGGAR, OF HUDDERSFIELD, ENGLAND

BRAKE-OPERATING MECHANISM FOR VEHICLES

Application filed July 25, 1929, Serial No. 381,028, and in Great Britain July 27, 1928.

My invention relates to brake-operating mechanism for vehicles, and has for its object to provide a locking and releasing device, for a pivoted brake lever, which does not depend upon the use of a ratchet toothed quadrant or segment, the teeth of which are engaged by a pawl on the brake lever.

With the ratchet and pawl arrangement, should the ratchet teeth become worn or broken, slipping of the brake may occur. My improved device aims at preventing any possibility of slipping of the brake, and also at providing a finer brake adjustment than is possible by the means above mentioned.

The improved device is characterized in that a wedge member, adapted to slide between a fixed bar or member and a bar or member pivotally connected at one end to said fixed member, is acted upon by a spring-actuated part associated with the brake lever and upon movement of the latter in a direction to apply the brake is caused to move inwardly between the fixed and movable parts, the pull of the brake or brakes then tending to move outwardly along the wedge a ring member or equivalent which binds the wedge in position. To enable the brakes to be released, a hand grip is provided on the brake lever, and is connected to the spring-actuated part acting upon the wedge, so that the wedge can be moved outwardly.

In the accompanying drawing,

Fig. 1 is an elevation of a device embodying the invention in one form, the brake lever and other parts being shown in full lines in the "off" position, and in dotted line in the "on" position;

Fig. 2 is a detail elevation showing the parts in the wedge-releasing position; and Fig. 3 is a detail illustrating a modified construction of means for moving the wedge.

Referring to the drawing, $a$ represents a bracket on which the brake lever $b$ is mounted pivotally at $c$. The means by which the brake lever is connected to the brake actuating mechanism are not shown as they form no part of the invention.

The upper edge of the bracket $a$ forms a segment of a circle struck from the pivot centre $c$, and at one end of the upper edge said bracket has a lug $a'$ on which is pivoted one end of a curved bar $d$. A wedge $e$ adapted to slide between the curved upper surface of the bracket and the curved inner face of the bar $d$, has two projections $e'$ and $e^2$, adapted to be engaged respectively by the depending fingers $f'$ and $f^2$ of a member $f$ mounted pivotally on a pin $g$ projecting from the brake lever $b$. A spring $h$, connected at one end to the brake lever and at the other end to the member $f$ on the side of its pivot remote from the finger $f'$, tends to hold the said finger normally in contact with the projection $e'$ on the wedge, so that as the brake lever is moved in a brake-applying direction the wedge will be moved towards the pivot of the bar $d$.

A hand grip $i$ pivoted to the brake lever at $i'$ is connected by a link $j$ to the member $f$ on the side of its pivot remote from the finger $f^2$, so that actuation of the hand grip will cause the finger $f^2$ to bear against the projection $e^2$ on the wedge and move the latter outwardly or away from the pivot of the bar $d$.

A boss $k$ on the pin $g$ rides upon the upper surface of the bar $d$, and another boss $k'$, on a pin $k^2$ projecting from the brake lever, rides against the upper surface of a segmental slot $m$ struck from the pivot centre of the brake lever. A link or bar $n$ connects the two pins $g$ and $k^2$ and serves, with the brake lever, to retain the wedge in position laterally.

The two bosses $k$ and $k'$, with the brake lever and the link or bar $n$ constitute together a ring member encircling the bar $d$ and the co-operating surface of the bracket $a$, and as the brake lever is moved in a direction to apply the brakes, this ring member is moved towards the point of pivotal connection of the bar to the bracket, the wedge member being at the same time drawn inwardly by means of the finger $f'$ under the action of the spring $h$.

Immediately the brake-applying movement of the brake lever is stopped, the pull of the brake or brakes thereon causes the lever to tend to move the ring member outwardly along the bar $d$.

As the angle made by the bar with the fixed bracket has been increased by the following-up movement of the wedge, the ring member cannot move outwardly, but binds the bar $d$ upon the wedge, and the greater the brake pull the greater the binding or locking action the ring member is caused to exert.

To release the brake, the brake lever is eased forward slightly to relieve the pressure on the wedge, and the latter is withdrawn by operation of the hand grip. The brake lever can then be moved back to release the brake, carrying with it the wedge which is at all times held by the spring $h$ in a "ready-to-engage" position.

In place of the rocking member $f$, with its depending fingers $f'$ and $f^2$, for moving the wedge, a plate such as $p$, Fig. 4, with inclined surfaces $p'$ and $p^2$ may be provided, a spring $h'$ normally pressing the plate downwardly so that the surface $p^2$ bears against the projection $e^2$ and presses the wedge in an engaging direction, whilst a connection $j$ to the hand grip enables the plate to be raised and the face $p'$ to press against the projection $e'$ and move the wedge in a releasing direction. The pins $g$ and $k^2$ with their respective bosses and the link $n$ will be employed as before, but for the sake of clearness have not been shown in Fig. 3.

The actual details of construction, arrangement and disposition of the parts employed may be varied otherwise than as above stated to suit any particular make of vehicle to which the invention is being applied, and it will be apparent that whilst being primarily or mainly intended for use in connection with the brake apparatus of vehicles the device is capable of use in other directions, where it is desired to hold a pivoted lever in any position of adjustment to which it may be moved.

Having thus described my invention, what I claim as new and desire to secure by Letters Patent is:—

1. A device of the character described comprising a lever, two members one of which is pivoted, a wedge member movable between said members to swing the pivoted member in one direction, the lever having a portion to contact with the pivoted member when it is swung in said direction, so as to prevent movement of the lever in one direction, means on the lever for moving the wedge member with the lever and operable manually to move the wedge member relatively to the lever and swing said pivoted member in the aforesaid direction, and spring means for urging said wedge member in the direction to permit said pivoted member to swing in the opposite direction.

2. A device of the character described comprising a lever, a fixed member, a pivoted member, a wedge member movable between said members to swing the pivoted member away from the fixed member when the wedge member moves toward the pivot of said pivoted member, the lever having a portion to contact with said pivoted member when the lever is swung away from said pivot to limit such movement of the lever, means on the lever for moving the wedge member with the lever and operable manually to move the wedge member relatively to the lever toward said pivot, and spring means for urging the wedge member relatively to the lever away from said pivot.

3. A device of the character described comprising a lever, a fixed member having a curved portion, a curved bar having one end pivoted to said fixed member, a wedge member movable between said bar and portion to swing said bar away from said portion when the wedge member is moved toward the pivot of said bar, the lever having means surrounding said portion and bar and adapted to contact with said bar when the lever is swung away from said pivot, to limit such movement of the lever, means on the lever for moving the wedge member with the lever and operable manually to move the wedge member relatively to the lever toward said pivot, and spring means for urging said wedge member relatively to the lever away from the pivot.

In testimony whereof I affix my signature.

HERBERT JAGGAR.